United States Patent [19]

Spindler

[11] Patent Number: 5,209,980
[45] Date of Patent: May 11, 1993

[54] TRANSPARENT COUNTERELECTRODES

[75] Inventor: Ralph E. Spindler, Pittsburgh, Pa.

[73] Assignee: PPG Industries, Inc., Pittsburgh, Pa.

[21] Appl. No.: 633,894

[22] Filed: Dec. 26, 1990

[51] Int. Cl.[5] .............................................. B32B 17/06
[52] U.S. Cl. ........................ 428/432; 428/688; 428/689; 428/697; 359/268; 359/269; 359/275
[58] Field of Search ............... 428/432, 688, 689, 697; 359/268, 269, 275

[56] References Cited

U.S. PATENT DOCUMENTS 4,768,865  9/1988  Greenberg et al. ................. 359/275
4,773,741  9/1988  Inaba et al. ....................... 359/266

FOREIGN PATENT DOCUMENTS 84303965.2 of 0000 European Pat. Off. .

OTHER PUBLICATIONS

*Journal of Electroanalytical Chemistry*, 252 (1988) pp. 461–466, Kulesza et al.
*Acc. Chem. Res.*, 19 pp. 162–168 (1986), Neff et al.
*Electrochimica Acta*, 34 pp. 963–968 (1989).
*Electrochimica Acta*, 35 pp. 1057–1060 (1990), Dong et al.
*Journal of Physical Chemistry*, 86, pp. 4361–4368, (1982), Rajan et al.
*Journal of the American Chemical Society*, 104, pp. 3751–3752, (1982), Itaya et al.
*Journal of Materials Science Letters*, 5, pp. 231–236 (1986), Reitman.

*Primary Examiner*—Ellis P. Robinson
*Assistant Examiner*—Timothy M. Speer
*Attorney, Agent, or Firm*—Donna L. Seidel

[57] ABSTRACT

Novel transparent complementary electrode materials for electrochromic cells are disclosed, of the general formula $[M^1]_4[M^2(CN)_6]_3$ wherein $M^1$ may be indium, gallium, gadolinium, lanthanum, and $M^2$ is iron. Unlike Prussian blue (where $M^1$ and $M^2$ are both iron), the complementary electrode materials of the present invention are stable, and do not have to be precharged.

9 Claims, 1 Drawing Sheet

SWITCHING DATA FOR InHCF/PAAMPS/WO$_3$

SWITCHING DATA FOR InHCF/PAAMPS/WO₃

TRANSPARENT COUNTERELECTRODES

BACKGROUND OF THE INVENTION

This invention relates generally to the art of electrochromic devices and more particularly to transparent complementary counterelectrodes.

Conventional electrochromic cells comprise a thin film of a persistent electrochromic material, i.e. a material responsive to the application of an electric field of a given polarity to change from a high-transmittance, non-absorbing state to a lower-transmittance, absorbing or reflecting state and remaining in the lower-transmittance state after the electric field is discontinued, preferably until an electric field of reversed polarity is applied to return the material to the high-transmittance state. The electrochromic film is in ion-conductive contact, preferably direct physical contact, with a layer of ion-conductive material. The ion-conductive material may be solid, liquid or gel. The electrochromic film and ion-conductive layers are disposed between two electrodes.

As a voltage is applied across the two electrodes, ions are conducted through the ion-conducting layer. When the electrode adjacent to the electrochromic film is the cathode, application of an electric field causes darkening of the film. Reversing the polarity causes reversal of the electrochromic properties, and the film reverts to its high transmittance state. Typically, the electrochromic film, e.g. tungsten oxide, is deposited on a glass substrate coated with an electroconductive film such as tin oxide to form one electrode. The counter electrode of the prior art has typically been a carbon-paper structure backed by a similar tin oxide coated glass substrate or a metal plate.

While this conventional electrochromic device structure might be acceptable for data displays in items such as digital watches, it is not suitable for large transparent articles such as windows. While the opaque carbon-paper counter electrode may be replaced with a thin conductive film such as tin oxide, indium oxide or gold, these thin film electrodes encounter lateral electrical resistance which decreases the speed and uniformity of charge distribution as the surface area of the device increases. More importantly, with electric fields of about 1 volt, half-cell reactions which result in the evolution of gas from the electrolysis of water occur at the counter electrode, depending on the polarity, as follows:

| Electrode | Reaction | Standard Potential |
|---|---|---|
| Cathode | $2H_2O + 2e^- - H_2 + 2OH^-$ | $-0.828$ volts |
| Anode | $2H_2O - 4H^+ + O_2 + 4e^-$ | $-1.229$ volts |

The hydrogen and oxygen gases produced by these reactions form bubbles which impair the optical properties of an electrochromic cell for use as a window.

The use of a metal mesh as the counter electrode is described in U.S. Pat. No. 4,768,865, the disclosure of which is incorporated herein by reference. The invention described therein allows transparency while providing uniform rapid charge distribution over a large surface area and participating in a balancing half-cell reaction at a lower potential which prevents electrolysis of water and concurrent gas evolution which would otherwise occur according to the following reactions, wherein x is typically up to about 0.5:

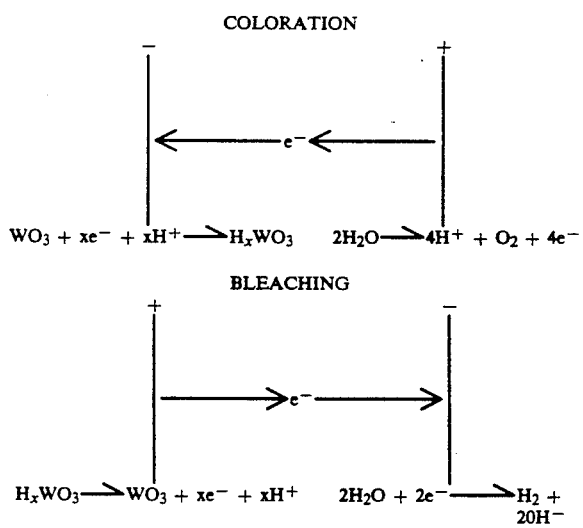

Instead of the hydrolysis of water at the counter electrode, pictured on the right above, the balancing half-cell reaction in response to the electrochromic transition of tungsten oxide is the oxidation or reduction of the metal of the metal grid counter electrode, which does not produce gas which can form bubbles and decrease the optical quality of the device.

European Patent Application No. 84303965.2 of Ataka et al. discloses a secondary cell comprising an anode, a cathode and an electrolyte in contact with both. The cathode contains as an electrochemically active material an oxidation product of a polynuclear metal cyanide complex of the general formula $$[M^A]_K[M^B(CN)_6]_L \cdot X\, H_2O$$

where $M^A$ is a metal having a valence of A, $M^B$ is a metal having a valence of B, K is from 1 to 4, L is from 1 to 3 and X is a positive number including 0, and wherein $A \times K = (6-B) \times L$. The anode contains as an electrochemically active material a reduction product of the polynuclear metal cyanide complex.

In the *Journal of Electroanalytical Chemistry*, 252 (1988) p. 461–466, Kulesza et al. describe the preparation, characterization and application of mixed-valence compounds due to their electrical conductivity and spectroscopic properties, particularly polynuclear transition-metal hexacyanometallates of the general formula $[M^A]_x[M^B(CN)_6]_y$ where $M^A$ and $M^B$ are transition metals with different oxidation states and x and y are stoichiometric subscripts. This reference describes an electrochemical method of fabricating films of indium (III)-hexacyanoferrate (III, II).

In *Acc. Chem. Res.*, 19 pp. 162–168 (1986), Neff et al. disclose that the potassium cation is the best choice as a counter ion for Prussian blue in aqueous electrolytes because of the optimum size of its hydrated ionic radius.

In *Electrochimica Acta*, 34 pp. 963–968 (1989) and 35 pp. 1057–1060 (1990), Dong et al. describe the preparation of thin films of indium hexacyanoferrate(II) on conductive substrates by cyclic voltammetry. It is further disclosed in aqueous cyclic voltammetry studies that both sodium and potassium ions may be readily transported into and out of the film by application, respectively, of a cathodic or anodic potential. It is also reported that in aqueous solutions containing $H^+$, $Li^+$, $Ca^{+2}$ and $NH_4^+$ salts, the indium hexacyanoferrate(II) films do not exhibit the redox peak characteristic of the $Fe(CN)_6^{-3}/Fe(CN)_6^{-4}$ redox couple.

In the *Journal of Physical Chemistry*, 86, pp. 4361-4368, (1982), Rajan et al. disclose films of ruthenium purple, $KFeRu(CN)_6$ or $NH_4FeRu(CN)_6$ that are electrochromic analogous to reduction of Prussian blue, but with no corresponding oxidation to the analogue Berlin green.

In the *Journal of the American Chemical Society*, 104, pp. 3751-3752, (1982), Itaya et al. describe electrochemical preparation of a Prussian blue analogue, iron-ruthenium cyanide.

In the *Journal of Materials Science Letters*, 5, pp. 231-236 (1986), Reitman described some physical and chemical properties of anhydrous rare earth (RE) hexacyanoferrates (II and III) in the series $(RE)Fe(CN)_6$ and $(RE)_4[Fe(CN)_6]_3$, excluding promethium.

SUMMARY OF THE INVENTION

The present invention provides alternative transparent complementary counterelectrodes using films such as indium(III)hexacyanoferrate(II), gadolinium(III)hexacyanoferrate(II) and gallium(III)hexacyanoferrate(II). Such films are produced by electroplating onto a conductive surface such as a tin oxide coated glass substrate for use as a transparent complementary counterelectrode, particularly in an electrochromic device comprising a tungsten oxide working electrode and a proton-conducting polymer electrolyte.

DESCRIPTION OF THE PREFERRED EMBODIMENTS

Figure 1:
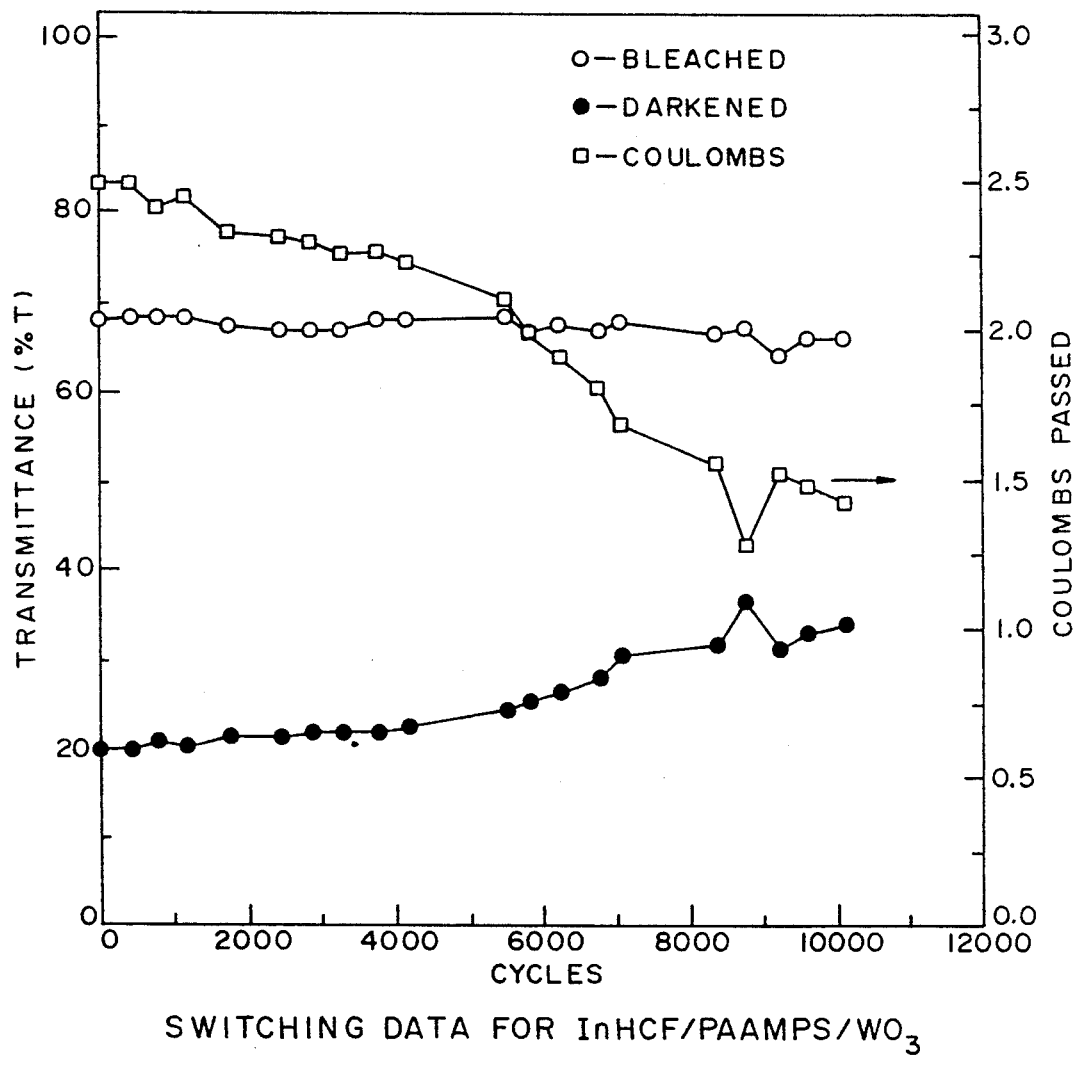
FIG. 1 illustrates the switching data for an electrochromic cell comprising a tungsten oxide electrochromic film, a poly(2-acrylamido-2-methylpropane sulfonic acid) electrolyte and an indium hexacyanoferrate complementary counterelectrode in accordance with the present invention.

The objective of the present invention is to provide alternatives to Prussian blue (PB) for use in electrochromic cells with proton-conducting polymer electrolytes. Although PB has several advantages as a complementary electrode such as fast optical response, and a good match for the color of $WO_3$, it also has some limitations. Among the limitations are poor stability in the bleached state and thermal bleaching at temperatures above about 50° C. Another limitation is an optical mismatch that can occur in a complementary electrochromic cell where the optimum bleached or darkened state cannot be attained because of an electrochemical imbalance in the cell which results in residual coloration. Further, Prussian blue requires the cathodically darkening electrode to be precharged before construction of an electrochromic cell.

The essence of the present invention is to substitute the $M^1$ ion in the PB structure $[M^1]_4[Fe(CN)_6]_3$ with other metal ions to influence the stability of PB while still maintaining its utility as a counter electrode in a $WO_3$-based electrochromic device with a proton-conducting polymer electrolyte. Substituting $In^{+3}$, it is found that indium(III) hexacyanoferrate(II), InHCF, is electrochemically stable in aqueous $KNO_3$ solution. InHCF is clear in the bleached state and light yellow in the reduced state. The low coloration efficiency of InHCF has an advantage, since the bleached state of an electrochromic cell derived from $WO_3$ and InHCF is not limited by the capacity of InHCF, as is seen with PB. A second advantage of InHCF is that in cells using $WO_3$ and InHCF, the $WO_3$ does not have to be precharged to form an electrochemically balanced system. $In^{+3}$ is not the only trivalent metal ion that can be substituted into the PB structure to produce a transparent counterelectrode. Gallium, gadolinium and other metal ions with only one accessible redox state may form a transparent film which may be used as a transparent counterelectrode. The present invention will be further understood from the following examples.

EXAMPLE I

The preparation of InHCF is carried out on a conductive tin oxide coated glass substrate. NESA ® tin oxide coated glass (a product of PPG Industries, Inc.) is cut to size ($4\frac{3}{4}" \times 8"$), cleaned ultrasonically in a bath containing Dart 210 detergent for 15 minutes at 150° F. (about 65° C.), rinsed with deionized $H_2O$, dried with $N_2$, soaked in concentrated $H_2SO_4$ for 5 minutes, and subsequently rinsed in tap water, deionized $H_2O$ and distilled $H_2O$. After drying the substrate, a four sided Cu-tape bus bar is placed around the periphery of the plate, and then the bus bar is protected from the plating solution by Teflon tape. The plating solution comprises 0.02M of $InCl_3$, 0.02M of $K_3Fe(CN)_6$, 0.5M KCl, and 0.01M HCl. A silver wire connected to the conductive substrate is used as a sacrificial anode to cause the deposition of InHCF. The current and the number of coulombs passed are measured in order to obtain uniform deposition. For the thickness range of InHCF films useful to obtain desired electrochromic activity, the InHCF film is clear in the reduced state and turns light yellow upon electrochemical oxidation. Electrochromic cells may be laminated with various proton-conducting polymer electrolytes.

The deposition rate of InHCF depends on the surface area of the silver wire exposed to the plating solution. The corrosion of Ag by the plating solution causes electrons to flow through the external circuit to the NESA ® coated substrate where ferricyanide is reduced to ferrocyanide. An insoluble indium-ferrocyanide complex forms and precipitates onto the NESA ® coated electrode. Due to the electronic conductivity of InHCF, the film continues to grow as more electrons are supplied to the substrate. In general, the best films are formed when a relatively thin film is first grown slowly followed by a more rapid deposition until the appropriate number of coulombs have been passed.

Initial testing of an InHCF/$WO_3$ electrochromic design is conducted using cells with the following configuration: NESA ®/InHCF(XC)/poly(2-acrylamido-2-methylpropane sulfonic acid)($[H_2O]$)/-[R—$SO_3H$]=3.5/1)/$WO_3$/NESA ®, where X indicates the coulombs of charge passed during the deposition of InHCF (NESA ® is a registered trademark of PPG Industries, Inc.). In order to obtain deep optical switching (550 nm) $\Delta\% T > 45\%$, at least 41 millicoulombs per square centimeter of charge is passed during the deposition. Cyclic voltammetry of the electrochromic cells suggests a voltage safety limit of $-1.45$ V for the darkening cycle and 0.8 V for bleaching. Using $V_d = -1.2$ V and $V_b = 0.8$ V, the cell NESA ® /InHCF(9C)/poly(2-acrylamido-2-methylpropane sulfonic acid)/$WO_3$/NESA ® requires 120 seconds to change from 68% T to 20% T (2.49 C, 550 nm), and the bleaching cycle requires 80 seconds to pass an equivalent number of coulombs. The bleaching response is rapid, since 98% of the optical change takes place within the first 20 seconds.

The cycling response of InHCF/WO$_3$ system is stable for somewhere between 3000 and 6000 cycles at which point the darkened state transmittance becomes somewhat higher and the coulombs of charge passed decreases somewhat, as shown in FIG. 1. The loss in the cell's optical and charge capacity does not seem to be irreversible, but rather is a kinetic effect, since if longer darkening times are used, the original characteristics of the cell can be recovered. The time required to completely darken the cell increases as a function of the number of cycles applied to the cell. Electrochromic cells prepared from InHCF, WO$_3$, and a solid proton conducting electrolyte are shown to exhibit reversible electrochromic switching up to 10,000 cycles at room temperature.

EXAMPLE II

A transparent counter electrode of Gallium(III)hexacyanoferrate(II), GaHCF, is prepared following the procedure of Example I. In this example GA(NO$_3$)$_3$ is used in place of InCl$_3$. Using a silver wire sacrificial anode, a clear, adherent film of GaHCF forms upon the conductive substrate. When the GaHCF film is laminated together with WO$_3$ and a solid polymer electrolyte, an electrochromic cell is formed which shows good switching characteristics.

EXAMPLE III

In this example, GdCl$_3$ is used instead of InCl$_3$ in the plating solution described in Example I. The plating solution is prepared by dissolving 5.9472 grams GdCl$_3$.9H$_2$O and 5.2682 grams K$_3$Fe(CN)$_6$ in 800 milliliters distilled H$_2$O to give a solution concentration of 0.02M for each of the salts. The solution is orange in color. Thin films are deposited as in Example I. A clear film forms on the conductive substrate by using the sacrificial anode method. Gadolinium(III)hexacyanoferrate(II) shows electrochemical activity, and when coupled with a solid polymer and WO$_3$, produces an electrochromically active transparency.

The Prussian blue structure [M$^1$]$_4$[M$^2$(CN)$_6$]$_3$ may be modified in accordance with the present invention by replacing M$^1$ with a variety of metal ions such as iron, gallium, ruthenium, aluminum, gadolinium, indium, and some lanthanides, and M$^2$ may be either iron or ruthenium. In the similar structure [M$^1$]$_2$[M$^2$(CN)$_6$], M$^1$ may be nickel or copper, while M$^2$ may be iron or ruthenium.

A wide range of cathodically electrochromic materials may be used in conjunction with the analogues of Prussian blue described above, including WO$_3$, MoO$_3$, and W$_x$Mo$_{1-x}$O$_3$(0<x<1). Any acidic electrolyte may be employed in these electrochromic cells, including polymer electrolytes such as poly(2-acrylamido-2-methyl-1-propanesulfonic acid), poly(vinyl sulfonic acid), fluorinated acidic polymers, and acidic copolymers as described in copending patent application U.S. Ser. No. 07/633,870 filed on even date herewith by T. G. Rukavina.

The scope of the present invention is defined by the following claims.

I claim:

1. An article having variable transmittance in response to an electric field comprising:
   a. a transparent substrate;
   b. a transparent electroconductive electrode material;
   c. a transparent electrochromic material;
   d. a transparent proton-conducting polymer electrolyte;
   e. a transparent complementary electroconductive material of the general formula [M$^1$]$_4$[M$^2$(CN)$_6$]$_3$ wherein M$^1$ is selected from the group consisting of indium, gallium, gadolinium, lanthanum, nickel, copper and vanadium, and M$^2$ is selected from the group consisting of iron and ruthenium.

2. An article according to claim 1, wherein the complementary electroconductive material is selected from the group consisting of indium(III)hexacyanoferrate(II), gallium(III)hexacyanoferrate(II), gadolinium(III)hexacyanoferrate(II) and lanthanum(III)hexacyanoferrate(II).

3. An article according to claim 2, wherein the transparent substrate is glass.

4. An article according to claim 2, wherein the transparent electroconductive electrode material is selected from the group consisting of tin oxide, indium oxide and mixtures thereof.

5. An article according to claim 2, wherein the electrochromic material is tungsten oxide.

6. An article according to claim 2, wherein the transparent electrolyte is a conductive polymer.

7. An article according to claim 6, wherein the proton-conducting polymer electrolyte is selected from the group consisting of poly (2-acrylamido-2-methylpropane sulfonic acid), poly (styrene sulfonic acid), poly(vinyl sulfonic acid), and fluorinated copolymers.

8. An article according to claim 7, wherein the proton-conducting polymer electrolyte is poly (2-acrylamido-2-methylpropane sulfonic acid).

9. An article according to claim 8, wherein the complementary electroconductive material is indium(III)hexacyanoferrate(II).

* * * * *